Figure 1:
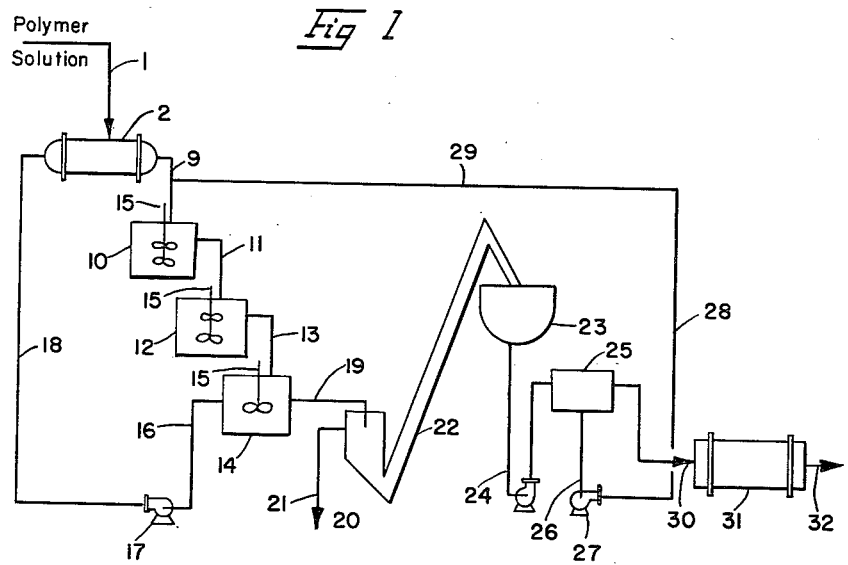

INVENTOR.
JOSEPH F. TERENZI

United States Patent Office 3,042,970
Patented July 10, 1962

3,042,970
PARTICULATION OF POLYMER BY EXTRUDING A SOLUTION THEREOF INTO A LIQUID STREAM OF FLUID
Joseph F. Terenzi, South Norwalk, Conn., assignor to American Cyanamid Company, New York, N.Y., a corporation of Maine
Filed Aug. 14, 1961, Ser. No. 131,715
7 Claims. (Cl. 18—47.3)

This invention relates to a method of separating polymers as discrete particles from their viscous solutions by intimately contacting the polymer solution with a non-solvent for the polymer, thereby effecting precipitation of the polymer. More particularly, this invention relates to the separation of polymer from its solution by creating large surface areas by way of extruding or injecting the viscous polymer solution into a turbulent stream of liquid nonsolvent precipitating agent which, through the force of the flow of the stream upon the extrudate, shears the extruded material into particles.

Heretofore, polymers have been separated or precipitated by various means. For example, the polymer may be precipitated from solution by dropwise or slow addition to an agitated vessel containing the nonsolvent. The polymer may also be separated from its solution by direct drying of the polymer, such as in drum drying. By another procedure, the polymer solution may be emulsified and the emulsion added to the nonsolvent phase to cause precipitation of the polymer. The drum drying or emulsifying procedures are generally followed when the viscosity of the polymer solution is too high to permit proceeding as by the slow addition to the liquid precipitant. Emulsification normally requires the use of a colloid mill or similar device which may severely degrade the polymer through application of high shearing rates. Furthermore, a fine precipitate is usually produced which, after drying, is difficult to handle and is often dusty, contributing to its commercial unattractiveness. Hot surface drying, such as drum drying, also degrades the polymer, although generally to a lesser extent than emulsification, depending on the conditions used. In the drum drying procedure, moreover, the non-volatile impurities such as monomers, catalysts, etc. are not removed. When dealing with polymer solutions having extremely high viscosity wherein the system approaches the solid state, processes such as drum drying are no longer feasible. The present invention provides a highly efficient and economical procedure which avoids the difficulties mentioned above and produces a polymeric material in highly beneficial condition. A further advantage of the invention resides in the elimination of subsequent polymer comminution steps, inasmuch as the extrudate is sheared into a suitable particle size, permitting the extrudate to be handled as a slurry in the nonsolvent.

It is an object of the present invention to provide a novel method of separating a polymeric material in particulate form from a viscous solution of the polymer. It is a further object to provide a continuous method of separating polymeric material from viscous solutions of the polymer by injecting the polymer solution into a tubulent stream of nonsolvent for the polymer, thereby precipitating the polymer. A still further object resides in the provision of a product which is substantially pure and unimpaired in molecular weight. Other objectives and advantages of the present invention will become apparent as the description of the present invention proceeds.

The invention, in essence, comprises two basic features or aspects: (I) wherein a viscous polymeric solution is extruded and sheared into segments, producing particles of the viscous polymeric solution of greatly increased surface area and (II) the extraction of the solvent from the polymeric particles, thereby precipitating the polymer. The procedure of the invention thus comprises feeding a viscous polymer solution under pressure through a suitable injecting apparatus, such as an extruding nozzle, directly into a moving stream of liquid precipitant nonsolvent for the polymer. Preferably, the injecting device is located within the moving stream and within the area of maximum stream turbulence, to obtain the advantage of the greatest shearing force of the stream, and is directed so as to inject the polymer at substantially right angles to the moving stream.

In principle, the turbulent nonsolvent stream passing the extruding nozzle locality must develop sufficient total drag force on the extruded "cylinders" of polymer solution to shear them off to form particulate segments or fragments of the solution. The size of the sheared polymer segments may be altered by varying the extrusion rate or by varying the velocity of the turbulent nonsolvent stream, or by an adjustment of both of these variables. Generally, the adjustment producing a segment size of below about 2 inches in length should be employed, inasmuch as some handling difficulty may be encountered with longer segments. Preferably, segment sizes of below 1 inch and between about ⅛ and ¾ inch in length are desirable for most purposes and afford a very suitable surface area as well as product size.

Figure 2:
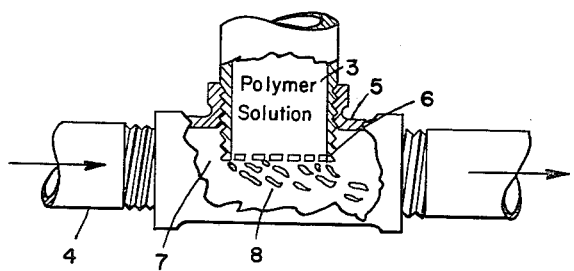

The process of the present invention will be further described by reference to the figures of the drawings wherein:

FIG. 1 is a flow diagram illustrating the various steps in the continuous precipitation of the polymer from solution and FIG. 2 shows diagrammatically an injection arrangement showing an extrusion nozzle extruding polymer solution at a point located substantially in the center of the path of a moving stream of nonsolvent.

The process, by reference to the drawing, will be described in detail in connection with the extrusion and separation by precipitation in methanol of polyacrylamide from a solution thereof in water, but it will be apparent, as hereinafter provided in the specification and claims and by way of examples, that other polymeric materials in solution may be employed utilizing suitable solvents and various liquid nonsolvent precipitants, in addition to methanol as precipitating media.

By reference to FIG. 1 of the drawing, a description of the invention will be facilitated. As shown therein, a viscous polymer is introduced through the feed line 1 into the extrusion unit 2, wherein, as more clearly shown by reference to FIG. 2, the polymer solution is fed under pressure into an extruding nozzle 3 securely fastened by a conventional T-arrangement 5 so as to extend into the path of flow of liquid precipitant in the nonsolvent flow pipe 4. The extrusion head 6, as shown, is located near the center 7 of the moving stream so that the force from the maximum velocity will be utilized to shear the material extruded from the extrusion head 6 into fragments 8.

It should be pointed out, that at this point in the process, no substantial precipitation of the polyacrylamide occurs. The polymer solution has merely been formed into small particles of polymer solution. Precipitation of the polyacrylamide may be effected subsequently by leaching out the residual solvent. This is usually carried out by holding the particles of polymer solution in a precipitating agent as described more fully, in regard to FIG. 1, hereinbelow. However, when other polymer solutions are formed into small particles by the process of this invention, precipitation of the polymer may sometimes be effected almost instantaneously by the stream of nonsolvent since many polymers precipitate more rapidly from solution than polyacrylamide. Whether any instantaneous precipitation or substantially none at all takes place depends significantly upon the highly viscous polymer solution being treated.

The production of particles or small cylinders having a predetermined particle size may be obtained by proper adjustment of the polymer solution injection rate and the linear velocity of the turbulent stream passing the nozzle face. The particle sizes obtained with various viscous polymer solutions is in accordance with empirical relationships, for example, those involving total drag forces, drag coefficients, the diameter of the holes in the nozzle, and the viscosity or shear strength of the polymer solution.

Various modifications may be made in the arrangement shown in FIG. 2 without departing from the scope of the invention. For example, various commercially available nozzles may be utilized and/or the nonsolvent flow pipe may be restricted at the extrusion point to vary the velocity and thus the force impinging upon the polymer being extruded, thereby affecting the size of the extruded fragments. The fragmented polymer is carried in the moving stream of nonsolvent in the pipe line 9 for a distance which may be sufficient to fully precipitate the polymer in transit, although, as shown, it is preferred that the particles be introduced into a series of holding tanks 10 and 12 through the lines 9 and 11, respectively, and thence into a concentrating tank 14 through the line 13. Each of the tanks is preferably equipped with a conventional stirrer 15 to enhance diffusion of the nonsolvent into the particles and accelerate precipitation of the polymer. The liquid precipitant or nonsolvent is withdrawn from the tank 14, which may be employed as a concentrating unit, through the line 16 and may be recirculated, preferably after the nonsolvent is concentrated and purified, through pump 17 into the extruding unit 2 through the line 18. Although holding tanks and a concentration tank are employed as described, it will be apparent that a single such tank may suffice, depending on material being processed, capacity of tank, retention time, etc. or that a simple pipe line providing sufficient residence time may be utilized. The polymer withdrawn from the tank 14 may be introduced through feed line 19 into a settling tank 20, wherein additional nonsolvent is removed at 21 from the solid polymer. The nonsolvent extracted at 20 may be reconcentrated and recycled into the system (not shown). From the settling tank 20, the polymer is transferred, as shown, by the conveyor 22 into a wash tank 23 where fresh nonsolvent is introduced and wherein the polymer is further purified. It will be apparent that the washing of the polymer as shown is an optional step and may be omitted, depending on other conditions of processing and on the product desired. The slurry from the wash tank is then introduced through the line 24 into a centrifuging unit 25, wherein the nonsolvent, which is substantially unaltered in strength, is removed from the precipitated polymer and may be conveniently fed into the system at a point so as to maintain the concentration of nonsolvent. As shown, the nonsolvent from the centrifuge step is withdrawn through line 26 and pumped at 27 through feed lines 28 and 29 into the first of the holding tanks 10, if desired, together with the extruded polymer through pipe line 9. The solid polymer withdrawn from the centrifuge through line 30 is dried in a suitable manner such as in a rotary dryer 31 and the product discharged at 32. It will be apparent that various modifications may be made in the process and system above described without departing from the inventive concept. The process of the invention thus comprises a novel procedure for particulation and for separation by precipitation of polymer from a solution by injecting the polymer solution into a nonsolvent for the polymer. The present procedure is highly economical and expeditious and avoids the degradation effects on the molecular weight of the polymer which have been of serious disadvantage in prior art procedures.

The inventive concept herein described is applicable to a wide range of polymeric materials, including homopolymers and copolymers, which one may desire to separate in solid form from solution of the polymer. Among the polymers which may be treated in accordance with the process of the present invention are polymers and copolymers of acrylamide, methacrylamide, acrylic acid and salts thereof, such as sodium acrylate, potassium acrylate, lithium acrylate, ammonium acrylate, and the like; polymers containing vinyl alcohol, vinyl sulphonate units and salts thereof and the like; styrene, ring-substituted alkyl styrenes such as orthomethyl styrene, metamethyl styrene, paramethyl styrene, 2,4-dimethyl styrene, 2,5-dimethyl styrene, 3,4-dimethyl styrene, or the higher monoalkyl or polyalkyl ring-substituted styrenes including the ethyl, propyl, butyl and the like; ring-substituted halostyrenes such as ortho, meta, or para chlorostyrene, 2,4-dichlorostyrene, 2,5-dichlorostyrene and the like; the nitriles such as acrylonitrile, methacrylonitrile, ethacrylonitrile, alpha-chloroacrylonitrile and the like; the esters of acrylic acids such as methyl acrylate, ethyl acrylate, butyl acrylate, methyl methacrylate, ethyl methacrylate, and the like.

The process of the present invention is applicable to polymer solutions and includes solutions of water-soluble, as well as organic and inorganic solvent-soluble, solutions and mixtures thereof. The invention is applicable to polymers having a molecular weight varying over a fairly wide range. For instance, the process may be applied to polymers having molecular weights between about 50,000 and in excess of 5,000,000, wherein the molecular weight of the higher polymers is a weight average molecular weight. When using polymeric materials having higher molecular weights, such as those between about 100,000 and 5,000,000 or even higher, the weight average molecular weight can be determined by the light scattering method. (See P. J. Flory, Principles of Polymer Chemistry, Cornell University Press, 1953, pages 256–316.)

The concentration of the polymer in the aqueous solution from which the polymer is precipitated, may vary over a fairly wide range, depending upon the concentration of the monomer in solution as prepared. This range may vary between about 3% by weight in the case of polyacrylamide, for example, and 80% by weight in the case of polymethylstyrene, for example, based on the total weight of solution. For most practical purposes, this inventive concept will be applicable to polymeric solutions having a concentration between about 5 and 70% by weight, based on the total weight of solution.

Any of the various known solvents for the polymer being separated may be employed in forming the solutions which are treated according to the inventive procedure. It will be apparent that compounds which are suitable as solvents for some polymers may, for different polymers, serve as the precipitating agent in the process. These precipitating agents are characterized by the fact that they are at least partially soluble in the solvent for the polymer and are inert to said polymeric material, inasmuch as it does not enter into any reaction with said polymeric material nor alter its chemical properties in any way. The precipitating agent must also be of such a character that the polymeric material is substantially insoluble therein. The precipitating agent may be miscible with the polymer solvent or only partially soluble therein. If the precipitating agent has only a limited solubility in the polymer solvent, the solution of said precipitating agent and polymer solvent prior to complete saturation, or at complete saturation, should be a nonsolvent for the polymeric material, and as a consequence, the polymeric material will precipitate out of said solution at some point prior to the formation of a two-phase system between the polymer solvent and the partially soluble precipitating agent.

In the case of polyacrylamide, water, which may serve as the polymerization media, is the preferred solvent. Organic compounds which may be employed as the precipitating liquid nonsolvent for aqueous solutions of polyacrylamide, as well as for other polymer solutions, include methanol, heptane, cyclohexane, carbon tetrachloride, and the like, and their mixtures, for example. The liquid compounds, when employed as nonsolvent precipitants, should preferably have the following properties: do not substantially dissolve the polymer; are non-toxic and inexpensive; do not substantially alter the molecular weight, i.e. are essentially inert; and are volatile and therefore easily removable. Included among the suitable additional organic compounds which may function as precipitating agents, are aliphatic compounds having from 5 to about 20 carbon atoms and mono- and di- aryl compounds, as well as substituted derivatives thereof and mixtures of these compounds. Illustrative compounds are pentane, hexane, benzene, toluene, xylene, tetrahydronaphthalene, halogenated aromatic compounds such as o-dichlorobenzene or chloronaphthalene; the ketones such as acetone, methylethyl ketone, diethyl ketone, or the aliphatic monohydric alcohols which, in addition to methanol, include ethanol, propanol, isopropanol and the like; the ethers such as dimethyl ether, methylethyl ether, diethyl ether and the like; dioxane; morpholine; the glycol mono and/or diethers, such as ethylene glycol monoethyl ether, ethylene glycol monobutyl ether, ethylene glycol monomethyl ether, diethylene glycol monoethyl ether, ethylene glycol diethyl ether, diethylene glycol dimethyl ether; or the glycol ether esters such as ethylene glycol monomethyl ether acetate and the like. Esters like ethyl acetate also may be used.

Although the previous discussion of the present invention has been directed almost entirely to the use of a precipitating agent or non-solvent to particulate the polymer solution, it is also within the scope of the present invention to particulate the polymer solution by utilizing a solvent for the polymer. In the case of an aqueous polyacrylamide solution, water could be utilized in place of the methanol to particulate the solution upon extrusion thereof. If the particles of polyacrylamide solution were allowed to remain in the water stream the polyacrylamide would merely be further diluted. Precipitation thereof could later be effected nevertheless, by contacting the more dilute solution with a precipitating agent. Generally however, it is more practical to use either a solvent or a non-solvent for the polymer depending upon the subsequent treatment to which the particles of solution will be subjected, i.e., precipitation or dilution. Gases, such as air, may also be used in place of the solvents or non-solvents to particulate the polymer solutions.

In addition to the foregoing compounds which also may function as the solvent in preparing the polymer solution, monomers may be employed as the solvent medium. Thus, for example, styrene or methylstyrene may function as solvent for polymethylstyrene or a copolymer of methylstyrene-acrylonitrile. The use of monomeric material as solvent may be particularly convenient and practical when the monomer serving as solvent is present due to the incomplete polymerization as a consequence of the polymerization technique, which is utilized mainly because complete conversion to 100% polymer is impractical. Such a polymerization procedure is disclosed in U.S. Patent 2,745,824, for example.

The procedure of the invention is employed with particular advantage in separating extremely viscous solutions which have heretofore been difficult and oftentimes impossible to process, for example, in the removal of solvent or unreacted monomer therefrom. Such solutions are such as those of polyacrylamide, polystyrene, polymethylstyrene, polyvinyl chloride, polymethylmethacrylate and methylstyrene-acrylonitrile copolymers, for example. The invention is, however, not limited to use solely with highly viscous polymers, and may find employment not only subsequent to polymerization procedures, but also in those instances where, for any reason, it is desired to particulate polymer or prepare a slurry or mixture thereof with other materials. The procedure of the invention, for example, may also be utilized to incorporate volatile swelling or foaming agents into polymers, as illustrated by Example 3 hereinbelow. In this particular application, the polymer to be foamed is generally dissolved in a solvent containing a volatile organic foaming agent, only to the extent necessary to form a viscous mass, and is then extruded into a turbulent stream of nonsolvent for the polymer to remove the excess solvent.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the inventive concept, except as is indicated in the appended claims. These examples are carried out at room temperature unless otherwise indicated.

*Example 1*

The polymer feed consists of a solution of polyacrylamide in water. The solution may be prepared via a direct batch solution polymerization, according to the typical procedure given below.

41 parts of commercial acrylamide is added to 458 parts of deionized water and the resulting solution is brought to 50° C.±3° C. At this point, 0.0193 part of $K_2S_2O_8$ and 0.00165 part of $K_2S_2O_5$, each dissolved in about 5 parts of water, are added and the pH is adjusted to about 2.0–3.0 by adding $H_3PO_4$. There is an induction period of about 30 minutes which is followed by rapid adiabatic polymerization. The temperature approaches 75° C. after 2 hours, and after 5–10 hours, the polymerization is essentially complete.

When adding the catalyst solution to the heated monomer solution and then adjusting the pH of the whole mixture as mentioned above, clogging of the various conduits through which the mixture flows to the polymerization vessel may result, due to initial and immediate polymerization of the monomer. To prevent such a procedural defect and in order to carry out the polymerization in a continuous or semi-continuous manner, the monomer, catalyst and acid may be admixed initially and pumped into a turbulent mixing zone. Deionized water is heated and is pumped into the turbulent mixing zone at substantially the same time as the monomer-catalyst-acid mixture. The amount of water added is that amount necessary to dilute the monomer-catalyst-acid mixture to a certain predetermined solids-content. The turbulent mixing zone has incorporated therein a temperature recording device which is connected to the heat source of the water heater. This recording device measures the temperature of the mixture in the mixing zone and automatically controls the temperature to which the water is heated before blending with the monomer-catalyst-acid mixture. In this manner, the resulting diluted monomer-catalyst-acid mixture is continuously heated by the hot water to a temperature above the desired polymerization temperature. The turbulent mixing zone is generally a small conduit of about ¼ inch in diameter and about 14 inches in length. Since the mixture is undergoing turbulence at all times, substantially no polymer precipitates in the mixing zone so as to clog the system. Additionally, no jacket is needed on the polymerization vessel, to which the mixture flows directly from the mixing zone, in order to maintain the polymerization temperature therein.

The resulting viscous solution has a solids content of approximately 8.0% and a viscosity of about the range $2 \times 10^6$ cps. (Brookfield Viscometer, Model RVF, 2 r.p.m.). This material is then pumped to an extrusion nozzle such as that described by reference to the drawing. An extrusion rate of 1.5 lbs. per minute is used and aqueous methanol (80% MeOH), circulation rate of 40 g.p.m. or 15.9 feet per second, passes the nozzle. Cylindrical segments or particles about ½" to ¾" in length and about 1/16" in diameter are produced. The polyacrylamide precipitates within the cylindrical particles by the action of the continuous (methanol) nonsolvent phase which is maintained at a concentration of about 80%. The diffusional process of hardening the percipitated polymer takes about 1 hour and this is accomplished by this retention time in tanks such as those shown as 10, 12 and 14 in the accompanying flow sheet. After washing the particles with pure methanol for about 1 hour, as shown at 23 on the flow sheet, the resulting products, after drying, are hard, porous, white, ½" long crumbs which may be utilized directly or, if desired, may be further comminuted to smaller particle size. The product has an improved dissolution rate, is less degraded than the drum dried product made by the same procedure, and has excellent properties when used as a settling aid in ore flotation.

*Example 2*

The polymer precipitated here is a copolymer of acrylamide and acrylic acid (85:15 mole ratio). The feed consists of a water solution of this copolymer having a solids content of about 27% and a monomer content of about 1.2%. Equal parts of this feed and pure methanol are blended in a small ribbon blender. The resulting cloudy solution, which is almost at the point of precipitation, is then fed into the extrusion unit and into the turbulent aqueous methanol stream. The stream flow rates and holding times used are those of Example 1. The precipitated product is in the form of discrete particles about ½" in length and 1/32" in diameter. The final monomer content of the dried material on evaluation is less than 0.02% of the polymer weight. The product has improved dissolution rate and a higher molecular weight than the product separated by emulsion precipitation. When added to paper pulp, the copolymer imparts improved dry strength to the subsequently formed paper sheet.

*Example 3*

The polymer feed solution used in this example consists of a polymethylstyrene (having the isomer ratio of and prepared according to the procedure of Example 1 of U.S. Patent 2,816,095) dissolved in petroleum ether and acrylonitrile for the purpose of preparing formed or expanded polymer. The following ingredients and procedure are used in preparing the solution.

|   | Parts by weight |
|---|---|
| Polymethylstyrene | 60 |
| Petroleum ether | 20 |
| Acrylonitrile | 20 |

The ingredients are rolled in a suitable container for four days. A uniform viscous material is obtained. The solution is fed into the extrusion nozzle in the same manner as indicated in Example 1, using the same flow rates. The resulting precipitated product upon separation and drying is white in color and resembled shredded cocoanut, i.e. curly, brittle strands. The dried product contains entrained petroleum ether.

The expandable polymethylstyrene prepared according to Example 3 is loaded loosely into a mold which is then closed except for small perforations less than 1/32" wide. The mold is placed in an autoclave and steam heated 4 minutes at 40 p.s.i. A lightweight, rigid object conforming to the shape of the mold and substantially closed cell is formed. The foamed molded article is resistant to compression and abrasion and has a specific gravity of about 0.095.

*Example 4*

A viscous solution of polymethacrylamide (viscosity about $1.8 \times 10^6$ cps.) is prepared by polymerizing 48 parts of methacrylamide in 470 parts of deionized water in the presence of 0.02 part of potassium persulfate and 0.33 part of potassium meta-bisulfite at a pH of 3.5 and an initial temperature of 55° C. for 1.5 hours followed by adiabatic polymerization for 7 hours when polymerization is substantially complete. The viscous polymeric solution is pumped into an extrusion nozzle of the type described in FIG. 2 of the drawing and extruded at a rate of 1 lb. per minute into a turbulent stream of acetone-water precipitant (85% acetone) moving at a velocity of 15.9 feet per second at the extruding nozzle. Particles of approximately ¼ inch to ½ inch in length and about ⅛ inch in diameter are produced which precipitate the polymer when maintained in the precipitant (acetone concentration above 80%) for about 50 minutes. After drying, a white porous particulate polymeric product is obtained.

*Example 5*

The procedure of Example 1 is substantially repeated with the exception that the potassium persulfate-potassium bisulfite is introduced in 2 equal increments, the second increment after polymerization has proceeded for 2 hours. The adiabatic polymerization period is 10 hours. The viscosity of the polymeric solution is $3.2 \times 10^6$ cps. The precipitating nonsolvent is ethyl alcohol (82% $C_2H_5OH$) having a velocity at the extruding nozzle of 20 feet per second. The extrusion rate is 1.0 lb. per minute. The particles extruded are about ¼ to ½ inch in size which after precipitating for 55 minutes are dried to form a hard, white porous free-flowing polymeric product.

*Example 6*

325 parts of styrene are charged to a stainless steel reactor and polymerized by heating at 110° C. until the viscosity is about 80 poises, a point at which the conversion of monomer to polymer is approximately 40%. The partially converted, fairly viscous mass is subsequently fed to a second reaction vessel equipped with sturdier agitator and more elaborate heat exchange means wherein the conversion to polymer is increased to about 75% polymer, a stage at which the solution of polymer in monomer has a viscosity of approximately 3500 poises. The mass is extremely viscous and further polymerization under controlled conditions is difficult. This polymer solution (containing 75% polymer monomer) is injected into a turbulent stream of methanol precipitant (velocity at nozzle—20 feet per second) at a rate of 1 lb. per minute. The extrudate is severed by the stream into ¼ to ½ inch segments. After a total retention time of 1 hour and 10 minutes, the precipitated polystyrene is substantially freed of the unreacted monomer (less than 0.5%). The monomer removed from the precipitated polymer is separated from the methanol precipitant by simple distillation. The monomer is utilized in subsequent polymerization and the purified methanol is recycled. The dried particulate product is suitable for use, directly, as a molding compound.

*Example 7*

260 parts of methylstyrene containing 65% para isomer, 33% ortho isomer and 2% meta isomer (99.5% pure) is polymerized and extruded according to the procedure of Example 6. The conversion of monomer to polymer is 70%, i.e. a solution of 70% polymer extruded) 30% monomer is obtained. The polymer, segmented into about ¼ inch size by the velocity of the methanol stream, after precipitation (holding time 2 hours) and drying has a purity of better than 99% and may be employed directly as a molding compound.

*Example 8*

The procedure employed in Example 6 is substantially repeated with the exception that 1000 parts of co-monomer mixture of methylstyrene (isomer ratio as in Example 7) and acrylonitrile in a weight ratio of 66:34 is polymerized in the presence of 0.1 part of tertiary dodecyl mercaptan until a conversion of 65% is obtained. The copolymer is extruded and severed into segments (¼ to ½ inch in length) precipitated and dried is a suitable molding compound, producing molded products of excellent color and clarity.

Example 9

1000 parts of polymethylstyrene, polymerized to 70% conversion according to the procedure of Example 7, is blended with 435 parts of a 40% solution of SBR rubber (23 parts styrene: 77 parts butadiene) in methylstyrene monomer. The blended viscous mass is extruded into a rapidly moving stream of methanol (20 feet per second) which severs the extrudate into segments (about ¾ inch in length). The resin-rubber blend is precipitated by a holding time of 55 minutes. The dried product is suitable directly as a molding composition. Articles molded from this resin-rubber blend have a markedly improved impact strength.

Example 10

300 parts of acrylonitrile is introduced into a reaction vessel containing 1200 parts of dimethyl formamide and equipped with agitator, thermometer, inlet and outlet means and means for purging the vessel with inert gas. The mixture is stirred and maintained under a blanket of $CO_2$. 2.5 parts of azobisisobutyronitrile catalyst is introduced slowly over a 1-hour period. The temperature is maintained at 65° C.–75° C. After a subsequent reaction period of 3 hours, a viscous polymeric solution of acrylonitrile in dimethyl formamide is obtained. The polymer from this viscous solution is precipitated from its solvent by extruding into a rapidly moving stream of water, the force of which severs the extrudate into segments about ½ inch in length. After a holding time of 70 minutes, the product is separated and dried to a free-flowing product.

Example 11

15 parts of acrylic acid are introduced into a suitable stainless steel reaction vessel containing 85 parts of deionized water and equipped with agitator, thermometer, and inlet and outlet ports. 0.015 part of potassium persulfate-potassium metabisulfite as catalyst are added and the polymerization is conducted at a temperature of 40° C.–60° C. for 6 hours, to yield a polyacrylic acid aqueous solution containing a solids content of about 15%. The viscous clear solution is extruded at a rate of 1.5 lbs. per minute directly into a rapidly moving stream of petroleum ether (velocity 20 feet per second) which shears the extrudate into particles of about ½ inch. After a precipitation holding time of 45 minutes, the product is centrifuged and dried to a white, free-flowing product.

Example 12

20 parts of commercially available granulated polymethyl methacrylate are dissolved in 80 parts of chloroform by mixing and tumbling overnight (16 hours). The resulting viscous solution is injected at a rate of 1 lb. per minute directly into a rapidly moving stream of ethanol (volicity 15 feet per second at the nozzle) which severs the extrudate into segments about ¼ inch long. The product, after completely precipitating and drying, is a free-flowing granular material suitable directly for molding.

Example 13

20 parts of commercially available granulated polycellulose acetate is dissolved in 80 parts of acetone by tumbling the polymer and solvent mixture overnight in a closed container. The resulting viscous solution is extruded at a rate of 1.5 lbs. per minute under pressure into a turbulent stream of water (velocity 20 feet per second at the nozzle) to particulate the extrudate. Segments of the extrudate ½–¾ inch are produced. The product, after complete precipitation (holding time of 1 hour and 10 minutes) and drying is a free-flowing granulated product suitable for molding.

Example 14

20 parts of commercially available polyvinyl chloride powder is dissolved in 80 parts of cyclohexane by stirring the polymer-solvent mixture for 4 hours. The resulting viscous mass is extruded under pressure at the rate of 1 lb. per minute into a turbulent stream of water (velocity 15 feet per second). Segments of about ½ inch are produced. The product, after a precipitation holding time of 1½ hours and drying, is suitable directly as a molding compound.

The present application is a continuation-in-part of my application Serial No. 737,759, filed May 26, 1958, now abandoned.

I claim:

1. A method of separating a highly viscous polymeric solution into particulate cylindrical form which comprises extruding the highly viscous polymeric solution into a stream of liquid volatile non-solvent flowing at a substantially right angle to the extruded solution, the flow of said non-solvent stream having a velocity sufficient to develop enough drag force on the extruded polymeric solution to cause tensile shear of the extruded solution and recovering particles of said polymeric solution from said non-solvent, wherein said particles have a length of less than about two inches and a diameter of from about 1/32 inch to about ⅛ inch and wherein said non-solvent is partially soluble in the solvent for the polymer, is inert to said polymeric material and is of such a character that the polymeric material is substantially insoluble therein.

2. A method of separating a highly viscous aqueous polyacrylamide solution into particulate cylindrical form which comprises extruding the highly viscous aqueous polyacrylamide solution into a stream of liquid volatile non-solvent flowing at a substantially right angle to the extruded aqueous polyacrylamide solution, the flow of non-solvent stream having a velocity sufficient to develop enough drag force on the extruded aqueous polyacrylamide solution to cause tensile shear of the extruded aqueous polyacrylamide solution and recovering particles of the polyacrylamide solution from said non-solvent, wherein said particles have a length of less than about two inches and a diameter of from about 1/32 inch to about ⅛ inch and wherein said non-solvent is partially soluble in the solvent for the polymer, is inert to said polymeric material and is of such character that the polymeric material is substantially insoluble therein.

3. A method of separating a highly viscous aqueous polyacrylamide solution into particulate cylindrical form which comprises extruding the highly viscous aqueous polyacrylamide solution into a stream of methanol flowing at a substantially right angle to the extruded aqueous polyacrylamide solution, the flow of the methanol having a velocity sufficient to develop enough drag force on the aqueous polyacrylamide solution to cause tensile rupture of the extruded aqueous polyacrylamide solution, and recovering particles of the polyacrylamide solution from said methanol, wherein said particles have a length of less than about two inches and a diameter of from about 1/32 inch to about ⅛ inch.

4. The method according to claim 2 wherein the particles of highly viscous polyacrylamide solution are continually contacted with the liquid volatile non-solvent in a holding tank for a period of at least 45 minutes, with vigorous agitation, until the solvent is leached from the particles of highly viscous polyacrylamide solution and recovering particles of substantially pure polymer.

5. The method according to claim 3 wherein the particles of highly viscous aqueous polyacrylamide solution are continually contacted with the methanol in a holding tank for a period of at least 45 minutes, with vigorous agitation, until the water is leached from the particles of highly viscous aqueous polyacrylamide solution and recovering particles of substantially pure polyacrylamide.

6. The method of claim 1 wherein the polymeric solution is a solution of polymethylstyrene.

7. The method of claim 1 wherein the polymeric solution is a solution of an acrylamide-acrylic acid copolymer.

References Cited in the file of this patent

UNITED STATES PATENTS

| | | |
|---|---|---|
| 2,366,460 | Semon | Jan. 2, 1945 |
| 2,378,732 | Semon et al. | June 19, 1945 |
| 2,459,748 | Johnson | Jan. 18, 1949 |
| 2,875,473 | Mitchell et al. | Mar. 3, 1959 |